US010718549B2

(12) United States Patent
Pugh et al.

(10) Patent No.: US 10,718,549 B2
(45) Date of Patent: Jul. 21, 2020

(54) HYBRID WATER HEATER

(71) Applicant: Rheem Manufacturing Company, Atlanta, GA (US)

(72) Inventors: Rodney K. Pugh, Wetumpka, AL (US); Emil J. Antoon, Montgomery, AL (US); Josue Figueroa, Nuevo Laredo (MX); Hector T. Donastorg, Auburn, AL (US); Richard T. Robbins, Huntington, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 195 days.

(21) Appl. No.: 15/798,137

(22) Filed: Oct. 30, 2017

(65) Prior Publication Data
US 2019/0128565 A1 May 2, 2019

(51) Int. Cl.
*F24H 4/04* (2006.01)
*F25B 30/02* (2006.01)
(Continued)

(52) U.S. Cl.
CPC ............... *F24H 4/04* (2013.01); *F24D 17/02* (2013.01); *F24D 19/1054* (2013.01); *F24H 9/2007* (2013.01); *F24H 9/2064* (2013.01); *F25B 30/02* (2013.01); *F25B 49/02* (2013.01); *F24D 2200/123* (2013.01); *F25B 2339/047* (2013.01);
(Continued)

(58) Field of Classification Search
CPC ........ F24H 4/04; F24H 9/2007; F24H 9/2064; F24H 1/208; F24H 4/02; F24H 6/00; F25B 30/02; F25B 49/02; F25B 2339/047; F25B 2600/112; F25B 2700/2117; F24D 17/02; F24D 19/1054; F24D 2200/123;
(Continued)

(56) References Cited

U.S. PATENT DOCUMENTS 2,668,420 A * 2/1954 Hammell .................. F24H 4/04
62/96
2,795,938 A * 6/1957 Galazzi ..................... F24H 4/04
62/208
(Continued)

FOREIGN PATENT DOCUMENTS

EP 0029219 A2 * 5/1981 .......... F24D 11/0228
WO WO 2014203514 6/2014

OTHER PUBLICATIONS

EP-0029219-A2 Translation (Year: 05-1).*
International Search Report dated Feb. 26, 2019 for PCT/18/58169.

*Primary Examiner* — Joseph F Trpisovsky
(74) *Attorney, Agent, or Firm* — Troutman Sanders LLP

(57) ABSTRACT

A heat pump water heater has a tank, a heat source, and a heat pump system. The heat pump system has a refrigerant path, at least a portion of which is in thermal communication with the water tank volume so that heat transfers from refrigerant to the water tank volume. A fan causes air to flow through a housing, and another portion of the refrigerant path includes an evaporator in the housing. The fan is within the housing and may further be within a second housing. The first housing may comprise a baffle to direct air flow. The fan may be a variable speed fan in communication with a controller, so that the controller controls the fan speed depending on a temperature of the refrigerant.

8 Claims, 6 Drawing Sheets

(51) Int. Cl.
*F24D 19/10* (2006.01)
*F24H 9/20* (2006.01)
*F24D 17/02* (2006.01)
*F25B 49/02* (2006.01)

(52) U.S. Cl.
CPC . *F25B 2600/112* (2013.01); *F25B 2700/2117* (2013.01)

(58) Field of Classification Search
CPC ................ F24D 2200/12; F24D 15/04; F24F 2013/205; F24F 5/00; F24F 13/08; F24F 13/081
See application file for complete search history.

(56) References Cited

U.S. PATENT DOCUMENTS

| | | | |
|---|---|---|---|
| 4,798,240 A * | 1/1989 | Gerstmann | F24D 3/08 165/48.1 |
| 8,385,729 B2 * | 2/2013 | Kleman | F24H 9/2021 392/308 |
| 2007/0039341 A1 | 2/2007 | Gordon et al. | |
| 2008/0000247 A1 | 1/2008 | Sinha et al. | |
| 2010/0209084 A1 | 8/2010 | Nelson et al. | |
| 2011/0197600 A1 | 8/2011 | Hamada et al. | |
| 2013/0025300 A1 | 1/2013 | Cho | |
| 2013/0287373 A1 | 10/2013 | Babb et al. | |
| 2015/0241087 A1 * | 8/2015 | Lesage | F25B 25/005 122/18.31 |
| 2017/0284702 A1 * | 10/2017 | Boros | F24H 4/02 |

* cited by examiner

HYBRID WATER HEATER

BACKGROUND OF THE PRESENT INVENTION

Various apparatus and methods have been proposed for supplementing heat applied to water in a water heater tank by means of a heat pump that acquires heat from air ambient to the water heater and conveys the acquired heat to the water tank water via a heat exchanger.

In a prior art system illustrated in FIG. 1A, for example, a water heater 10 comprises a tank 12 formed by a metal, for example steel, polymer, or porcelain tank wall that encloses a volume of water therein and that is, in turn, enclosed by an outer metal housing 18. Tank 12 receives cold water from a cold water inlet 14 and expels hot water from a hot water outlet 16. Two heating elements (not shown) are secured within harnesses (not shown) attached to and extending through outer housing 18 and that extend through and attach to the outer surface of tank 12. Each heating element attaches to a respective harness and extends through the wall of tank 12 into the tank's interior volume. An electrical power source provides electric current to each heating element under the control of the water heater's control system so that the electric current passes through the resistive elements, causing their temperature to rise and thereby causing the resistive elements to contribute heat to water within the tank interior volume. The control system actuates the resistive heating elements (i.e., provides power to them) in response to the output of one or more temperature sensors attached to the exterior of tank 12 or extending therethrough that provide signals to the control system indicating the temperature of water within the tank volume. In particular, the control system actuates the heating elements when the tank water temperature is low and deactivates the one or more heating elements when the tank water temperature reaches a predetermined upper set point.

Cold water from inlet 14 is attached to a private or public water system that provides water under pressure to end user water systems such as water heater 10. Hot water outlet 16 is attached to a hot water piping system within a residential or commercial building that delivers hot water to faucets, appliances, and other equipment that draw hot water upon actuation of an associated valve. When those valves are open, causing low pressure at hot water outlet 16, water pressure within tank 12 (maintained by pressure applied by the water source at cold water inlet 14) expels heated water through outlet 16.

A refrigerant conduit 20 conducts refrigerant through a refrigerant path that encompasses a condenser coil portion 22, an expansion valve 24, an evaporator coil 26, and a compressor 28. Condenser coil 22 comprises a portion of refrigerant conduit 20 that wraps around the exterior of tank 12, inside the enclosure of outer tank housing 18. Following condenser coil 22, refrigerant conduit 20 leads to expansion valve 24. As should be understood, the expansion valve receives a fluid input at a high pressure and, depending on the settings within the valve, outputs the fluid at a lower pressure, allowing the pressurized refrigerant entering the valve to drop in pressure in the coil of evaporator 26 and change phase from a liquid to a gas. As should also be understood, compressor 28 is a pump that additionally provides pressure to refrigerant flowing through the refrigerant path to thereby maintain the refrigerant flowing through the complete closed loop that the path defines.

More specifically, compressor 28 pumps the gaseous refrigerant received from evaporator 26 forward, increasing the refrigerant's pressure and temperature and causing the now-hotter refrigerant gas to flow through condenser coil 22. The hot refrigerant is separated from water within tank 12 by the refrigerant conduit line wall and the wall of tank 12, both of which may be metallic and therefore relatively heat-conductive. Thus, as the refrigerant travels through the length of condenser coil 22, the refrigerant transfers heat through these walls to the cooler water within the inner tank volume. The refrigerant thereby acts as a heat source that supplements the resistive heating elements.

As refrigerant flows through condenser coil 22, it changes phase from gas to liquid. Still under the pressure provided by compressor 28, however, the now-liquid refrigerant flows from condenser 22 to expansion valve 24, which drops the liquid refrigerant's pressure as it enters evaporator coil 26. A fan 30 is actuated concurrently with compressor 28 and is positioned adjacent holes in housing 18 so that the fan pushes an output air stream 32 from a volume 34 within the upper portion of housing 18, across evaporator coil 26, through the holes, and out to an exterior area ambient to the water tank. Outer housing 18 defines a second set of holes 36 on the opposite side of volume 34 from the holes adjacent to fan 30 and evaporator 26, so that fan 30 also draws an input air stream 38 into volume 34. Thus, fan 30 draws an air flow from outside water heater 10, into volume 34, and across compressor 28, through evaporator coil 26, and out of water heater 10 at air flow 32. Particularly where water heater 10 is in a building, ambient air 38 is at a relatively warm temperature, but as the air flow passes over compressor 28 during the compressor's operation, the air flow draws further heat generated by the compressor. Within evaporator 26, the now-lower pressure refrigerant draws heat energy from the air flow over coil 26 and transitions to a gaseous phase. The now-warmer gaseous refrigerant discharged from evaporator coil 26 then returns to compressor 28 via a suction portion 40 of refrigerant line 20, and the now-cooler air flow 32 flows out of the water heater housing through the holes in the housing in front of the evaporator fan, and the cycle repeats.

As is apparent from the discussion above regarding water tank 10 as illustrated in FIG. 1A, condenser 22 forms part of a heat exchanger that transfers heat between the refrigerant of conduit line 20 and the water stored in the inner volume of tank 12. In a prior art configuration illustrated in FIG. 1B, condenser 22 is part of a heat exchanger that is separate from tank 12. In this arrangement, tank 12, compressor 28, evaporator 26, fan 30, the air flow, and conduit line 20 operate as discussed above with respect to FIG. 1A, except that the portion of conduit line 20 forming condenser coil 22 does not wrap around the exterior of tank 12. Instead, coil 22 is housed in a middle chamber 42 disposed between upper volume 34 and the lower volume that encloses tank 12. A water line 42 extends from the inner volume of tank 12 to and from a heat exchanger in which condenser coil 22 is also disposed. A pump (not shown) is provided in line 42 to pump the tank water to and from the heat exchanger. The refrigerant line of coil 22 and the water line of coil 42 are adjacent to one another in the heat exchanger, so that the refrigerant flowing through coil 22 contributes heat to the water flowing through line 42 across the walls of conduit 20 and conduit 42. Otherwise, the system illustrated in FIG. 1B operates in a manner as does the system illustrated in FIG. 1A.

Because air flow 32 exiting the housing has been cooled by its passage over the evaporator, attempts have been made to attach ducts of building heating, ventilation, and air-conditioning (HVAC) systems to the flat side of the water heater at the outlet, to thereby acquire the cooled air for contribution to the building's air-conditioned space. Because the duct introduces resistance to air flow, however, this practice increases the flow resistance seen by the air flow generated by the evaporator fan, thereby increasing an amount of that air flow that, instead of flowing out of the water heater housing and into the duct, flows radially (with respect to the forward air flow direction away from the fan) away from the fan but still within the water heater housing. This can, in turn, increase pressure in the water heater's upper chamber, thereby lowering the temperature in the upper chamber and decreasing the fan's ability to draw warmer air from outside the water heater into the air flow, in turn thereby lowering the water heater's efficiency.

In particular, it was known to attach a flange on the water heater exterior outward of the outlet orifice so that the duct could be attached to the flange. Such an arrangement required effort on the part of the retrofitter to attach the flange, and the retrofit configuration could introduce a pressure drop. When a fluid leaves an orifice into a space having a cross-sectional area greater than that of the orifice (e.g., in the direction of air flow, the cross-sectional area has a step-increase from the orifice into the space), the diverging air flow streamlines and recirculating flow immediately downstream of the orifice may cause a pressure drop that increases flow resistance. In retrofitting, due to the difficulty of sealing a duct over the orifice, the ductwork is oversized compared to the cross-sectional area of the hole(s) to thereby fully cover the outlet, in turn forming an orifice with such a pressure drop.

Other heat exchange arrangements are possible, for example as discussed at A. Hepbasli and Y. Kalinci, *A Review of Heat Pump Water Heating Systems*, Renew. Sustain. Energy Rev. (2008).

If shipped on their sides, hybrid water heaters may be subject to damage for a number of reasons. First, it is generally known that if oil leaks out of a compressor through its discharge tube and does not return to the compressor in the reverse direction, the leaked oil may in some circumstances cause the compressor to fail due to lack of lubrication. Second, the compressor typically "floats" on isolation pads in order to dampen vibrations and minimize noise. That is, the compressor mounts to the tank via non-rigid couplings. Therefore, the compressor, when suspended so that it is cantilevered and extends sideways from its mount, can be subject to considerable movement. This may cause stresses in the tubing of the refrigerant conduit line, which is generally rigid, and further creates a risk that the compressor will impact the evaporator coil, thereby damaging the evaporator coil or its heat exchanger fins and decreasing performance.

SUMMARY OF THE INVENTION

A heat pump water heater according to an embodiment of the present invention has a first housing and a tank for holding water within the first housing with a wall that defines a volume. A heat source is disposed with respect to the volume to convey heat to water in the tank. A refrigerant conduit defines at least part of a closed refrigerant path. A pump is disposed proximate the tank and in fluid communication with the fluid conduit so that the pump is part of the refrigerant path and, when operative, pumps refrigerant through the closed refrigerant path. A first portion of the conduit is in thermal communication with the volume so that the refrigerant flowing through the refrigerant path transfers heat to water in the volume. A fan is disposed adjacent the tank and with respect to a second portion of the conduit so that operation of the fan moves an air flow across the second portion of the conduit. The fan is disposed within a second housing so that the air flow, where output from the fan, is received within the second housing without flow into an interior of the first housing outside the second housing. The second housing has a protruding portion that extends through the first housing and beyond the first housing into an area exterior to the first housing.

In another embodiment, a heat pump water heater has a tank having a tank wall that defines a volume and a heat source disposed with respect to the volume to convey heat to water in the tank. A refrigerant conduit defines at least part of a closed refrigerant path. A pump is disposed proximate the tank and in fluid communication with the fluid conduit so that the pump is part of the refrigerant path and, when operative, pumps refrigerant through the closed refrigerant path. A portion of the conduit is in thermal communication with the volume so that refrigerant flowing through the refrigerant path transfers heat to water in the volume. A fan is disposed adjacent the tank and with respect to a coil defined by the conduit so that operation of the fan moves an air flow across the coil. A temperature sensor is in thermal communication with the conduit to thereby detect temperature of refrigerant in the conduit. A controller is in communication with the temperature sensor so that the controller receives signals from the temperature sensor corresponding to temperature of the refrigerant. The controller is configured to control a speed of the fan in response to temperature of the refrigerant.

In a further embodiment, a heat pump water heater has a tank having a tank wall that defines a volume and a heat source disposed with respect to the volume to convey heat to water in the tank. A refrigerant conduit defines at least part of a closed refrigerant path. A pump is disposed proximate the tank and in fluid communication with the fluid conduit so that the pump is part of the refrigerant path and, when operative, pumps refrigerant through the closed refrigerant path. A first portion of the conduit is in thermal communication with the volume so that refrigerant flowing through the refrigerant path in the first portion transfers heat to water in the volume. A fan is disposed adjacent the tank and with respect to a second portion of the conduit so that operation of the fan moves an air flow across the second portion. The pump, the second portion, and the fan are disposed in a first housing proximate the tank. The first housing defines an opening to an area ambient the first housing and through which air flows to form the air flow. At least one baffle within the first housing is disposed between the opening and the second portion of the conduit, upstream from the second portion of the conduit with respect to the air flow, and is formed so that the baffle directs the air flow toward the second portion of the conduit and away from an interior surface of the first housing.

In a still further embodiment, a heat pump water heater has a housing, a tank for holding water within the housing and having a tank wall that defines a volume, a heat source disposed with respect to the volume to convey heat to water in the tank, a refrigerant conduit that defines at least part of a closed refrigerant path, and a pump disposed proximate the tank and in fluid communication with the fluid conduit so that the pump is part of the refrigerant path and, when operative, pumps refrigerant through the closed refrigerant path. A first portion of the conduit is in thermal communication with the volume so that the refrigerant flowing through the refrigerant path transfers heat to water in the volume. A fan is disposed adjacent the tank with respect to a second portion of the conduit so that operation of the fan moves an air flow across the second portion of the conduit. The refrigerant conduit defines a third portion in fluid communication with an interior volume of the pump and extending from the pump to at least one predetermined position in the refrigerant path. In an upright position of the housing, the tank, and the pump, the third portion slopes downward from the at least one predetermined position to the pump over an entire length of the third portion between the at least one predetermined position and the pump. In at least one horizontal position of the housing, the tank, and the pump, transverse to the upright position, the at least one predetermined position is higher than a fluid connection between the pump and the third portion.

In an embodiment of a method of designing a heat pump water heater having a first housing, a tank for holding water within the housing and having a tank wall that defines a volume, a heat source disposed with respect to the volume to convey heat to water in the tank, a refrigerant conduit that defines at least part of a closed refrigerant path, and a pump disposed proximate the tank and in fluid communication with the fluid conduit so that the pump is part of the refrigerant path and, when operative, pumps refrigerant through the closed refrigerant path, where a first portion of the conduit is in thermal communication with the volume so that the refrigerant flowing through the refrigerant path transfers heat to water in the volume, and wherein a fan disposed adjacent the tank and with respect to a second portion of the conduit so that operation of the fan moves an air flow across the second portion of the conduit, a minimum heat capacity for contribution of heat from the air flow to refrigerant flowing through the closed refrigerant path during operation of the pump and the fan is defined. A minimum air flow rate through the second portion during operation of the fan is defined. A maximum level of noise for production by the fan during operation of the fan is defined. Static losses arising from the air flow are estimated, based upon disposition of components within the housing. A fan having a capacity to provide at least the minimum air flow rate is selected based upon the disposition of components within the housing and the estimated static losses, while generating noise no greater than the maximum level of noise. A configuration of the second portion having a surface area and air flow resistance that maintains the air flow at a rate at or above the minimum air flow rate is selected based upon the capacity of the selected fan and that results in a heat capacity at or above the minimum heat capacity.

The accompanying drawings, which are incorporated in and constitute a part of this specification, illustrate one or more embodiments of the present invention.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

DETAILED DESCRIPTION OF PREFERRED EMBODIMENTS

Reference will now be made in detail to embodiments of the invention, one or more examples of which are illustrated in the accompanying drawings. Each example is provided by way of explanation, not limitation. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1A:
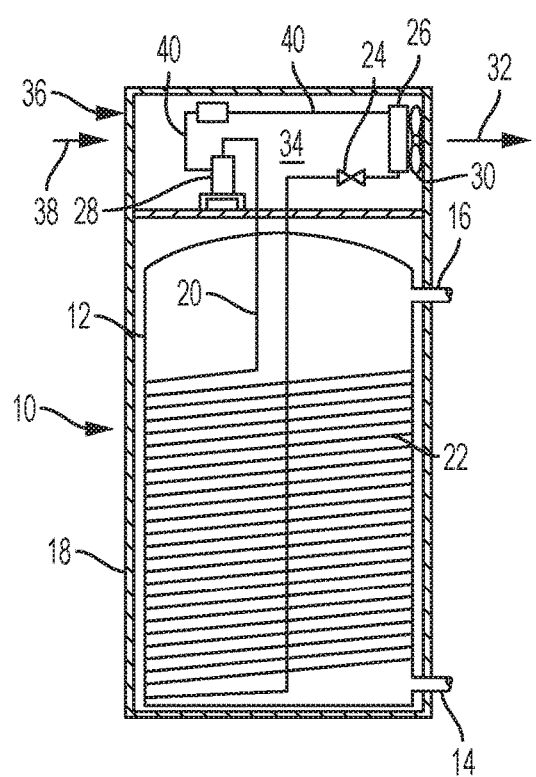
FIG. 1A is a schematic view of a heat pump water heater system of the prior art.
Figure 1B:
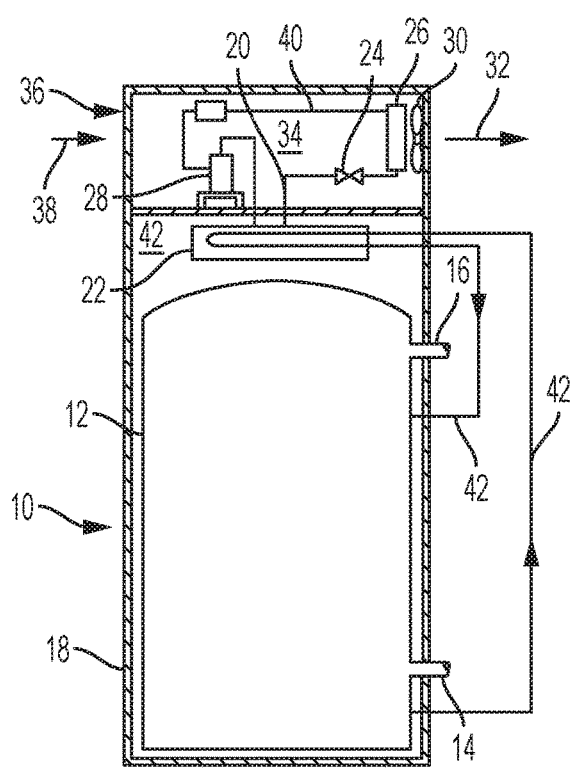
FIG. 1B is a schematic view of a heat pump water heater system of the prior art.
Figure 2:
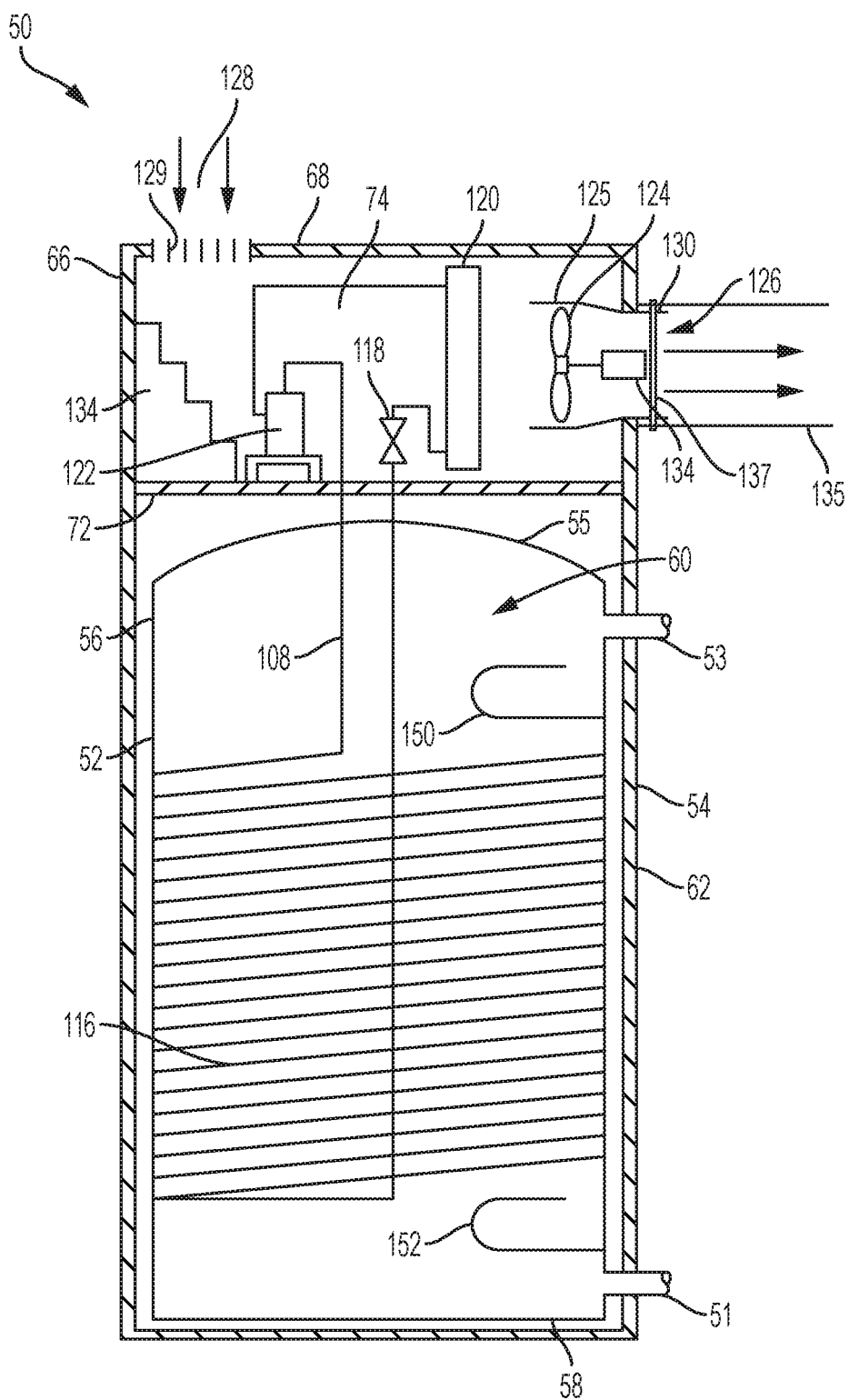
FIG. 2 is a schematic view of a heat pump water heater system of an embodiment of the present invention.

As used herein, terms referring to a direction or a position relative to the orientation of the water heater, such as but not limited to "vertical," "horizontal," "upper," "lower," "above," or "below," refer to directions and relative positions with respect to the water heater's orientation in its normal intended operation, as indicated in FIG. 2. Thus, for instance, the terms "vertical" and "upper" refer to the vertical orientation and relative upper position in the perspective of FIG. 2, and should be understood in that context, even with respect to a water heater that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms takes at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Figure 3:
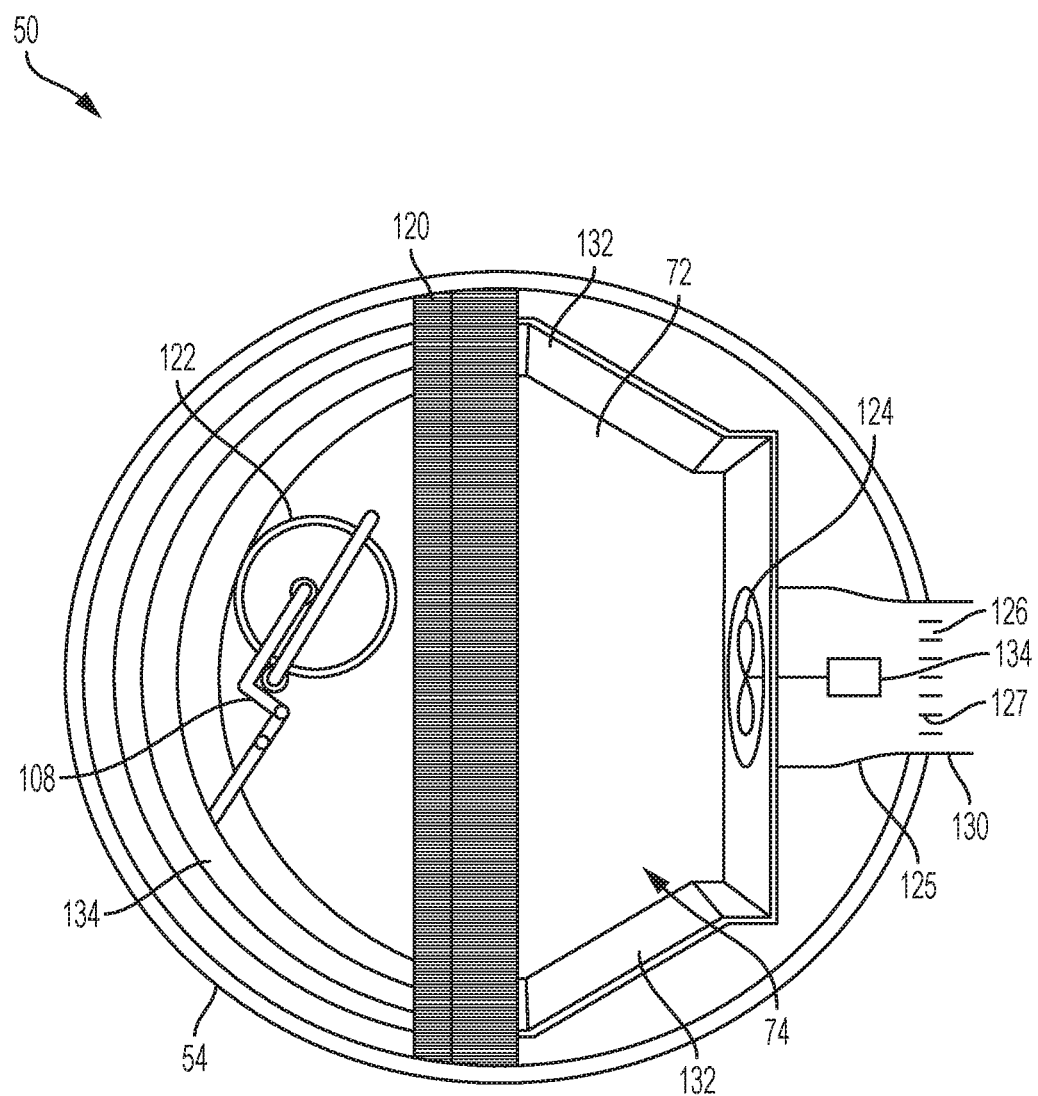
FIG. 3 is a partial top view of the heat pump water heater system as in FIG. 2.

Referring now to FIGS. 2 and 3, a water heater 50 includes a vertically oriented, generally cylindrical water tank body 52 enclosed by an outer housing 54. Body 52 is defined by a domed top wall, or head, portion 55, a cylindrical side wall portion 56, and a bottom wall portion 58. Side body wall 56, top wall 55, and bottom wall 58 generally define an interior volume 60 for storing water therein. Side wall 56, top wall 55, and bottom wall or floor 58 may be formed from materials common to the construction of water heaters, for example a carbon steel outer wall layer with a glass or porcelain enamel inner surface, or uncoated stainless steel.

Outer housing 54 is also made of a suitable metal, such as carbon steel. The outer housing completely surrounds tank body 52 and is comprised of a main cylindrical portion 62, an upper cylindrical skirt portion 66, and a closed disc-shaped top portion 68. Outer housing 54 also includes a disc-shaped interior shelf 72 that sits atop center body section 62 of the outer housing and provides a platform for certain components of the heat pump system of water heater 50, as described below. Shelf 72 thereby separates the lower interior volume of outer housing 54, which encloses water heater body 52, from a first housing enclosing an upper volume 74 of outer housing 54, which encloses such heat pump components and further defines an air flow passage.

A cold water inlet pipe 51 extends through the side of the water heater outer housing at cylindrical portion 62, through side wall 56, and into interior tank volume 60 at a location near the bottom of volume 60. Pipe 51 attaches to a fitting (not shown) that connects pipe 51 to a cold water source, e.g. a building cold water pipe connected to a municipal water service line. A hot water outlet pipe 53 extends from interior tank volume 60, through side wall 56 and main cylindrical portion 62, at a location near the top of tank volume 60. The exterior end of hot water pipe 53 attaches to a building hot water line (not shown), that in turn leads to valves of appliances, faucets, or other devices within the building that conduct or use hot water. Cold water inlet pipe 51 enters volume 60 lower into tank interior than does hot water outlet pipe 53. As should be understood, warmer water is less dense than colder water and therefore tends to rise to the upper part of the tank's inner volume. Thus, outlet 53, being relatively high on the tank, draws warmer water for a longer period of time then it would if placed lower, while the lower placement of inlet 51 prevents the cold water inlet from undesirably cooling the warm water at the top of the tank. It should be understood, however, that other inlet and outlet configurations may be implemented, for instance a top inlet with a dip tube. Referring to the embodiment of FIG. 2, as hot water is drawn from tank 52, cold water replaces the hot water, but the upper position of the water outlet maximizes the volume of water above a threshold temperature, e.g. 120° F., that can be continuously drawn from the tank in a given amount of time, e.g. one hour.

A pair of top and bottom vertically spaced electric resistance heating assemblies 150 and 152 extend inwardly into interior volume 60 through tank wall 52. The two resistive heating elements have respective electrical fittings (not shown) at their ends that are disposed between tank 52 and outer housing 54 in respective housings (not shown) that extend between the tank and the outer housing and that protect the electrical fittings, for example from foam insulation that may be installed in the gap between tank 52 and outer housing 54. The heating element housings include or cooperate with respective covers (not shown) that cover holes in outer housing 54 to allow access to the electrical fittings. A power source provides electric current to the heating elements via the electrical fittings and respective relays that are controlled by a controller at a water heater control board (not shown) that communicates with respective temperature sensors housed in the electrical fittings or otherwise disposed through or on the wall of tank 52.

During typical operations of water heater 50, cold water from the pressurized municipal source flows into water heater interior volume 60, wherein the water is heated by electric resistance heating elements 150 and 152 and stored for later use. When plumbing fixtures (not shown) within the building or other facility within which water heater 50 is installed and to which water heater 50 is connected via hot water outlet 53 are actuated to allow flow of hot water from the tank via hot water outlet pipe 53, the stored, heated water within interior volume 60 of water heater 50 flows outwardly through hot water outlet pipe 53 to the fixtures by way of hot water supply piping (not shown) as should be understood in this art. The discharge of heated water outwardly through hot water outlet pipe 53 creates capacity within volume 60 that is correspondingly filled by pressurized cold water through inlet 51. This lowers the temperature of water in the tank, which is in turn heated by electric resistance heating assemblies 150 and 152. The control board controller monitors temperature of water in the tank based on a signal received from one or more of the temperature sensors at or on the tank wall proximate respective heating elements, so that the signals from the temperature sensors correspond to temperature of water in the tank proximate the heating elements, and actuates heating elements 150 and/or 152 (by actuating the respective relays to thereby connect the power source to the heating elements) when the controller detects a water temperature below a predetermined low threshold value (or, low set point) and maintaining the heating elements in an actuated state until the processor detects water temperature above a predetermined high threshold value (or, high threshold), where the high set point is greater than the low set point as should be understood. Once the controller detects that the water temperature about a given heating element has heated to a point at or above the high set point, the controller deactivates current flow to that heating element (by deactivating the corresponding relay) and maintains the heating element in its inactive state until that heating element's temperature sensor again reports a temperature at or below the low set point, and the cycle repeats.

Components of a heat pump disposed within volume 74 comprise a compressor 122, an expansion valve 118, an evaporator 120, and a fan 124/fan motor 134. A condenser coil comprised of a refrigerant line 108 extends from volume 108 down into the water tank compartment. Refrigerant line 108 is made, in this example, of an aluminum conduit line that extends downward from compressor 122, through intermediate shelf 72, to wrap tightly around at least a portion of side body 56 of water tank 52, forming a coil/condenser 116. A surface of the refrigerant line in one or more embodiments may be formed with a flat surface, so that the line has a generally "D" shaped cross section, so that the generally flat line surface generally conforms to the surface of side body 56 with a greater surface area than it would if the line has a generally circular cross section, although it should be understood that the line cross section may be generally circular or may define still other configurations. From coil 116, refrigerant line 108 continues to expansion valve 118 upstream from an evaporator coil 120, the construction of which should be understood and may vary. In one example, the evaporator is a length of coiled tubing with fins attached to the tubing to radiate heat acquired from warm air flowing over the fins to the coil. In any construction, however, the refrigerant path through the evaporator may be considered to be a part of refrigerant line 108. In one embodiment, the return line portion of the refrigerant line from coil 116 runs between the coil and the exterior side of tank 52, but it may also run outside the coil. From evaporator 120, refrigerant line 108 continues to compressor 122 of the heat pump system.

Fan 124 is disposed in volume 74 between evaporator coil 120 and an opening in the housing well, e.g. an outlet hole 126, so that fan 124 induces air flow over evaporator coil 120. Fan 124 is a variable speed fan, the operation of which is controlled by a controller to vary the fan's speed between two alternatively (higher or lower) speeds in response to a need to induce a higher or lower pressure and corresponding higher or lower air flow rate, as disclosed in more detail below. Fan 124 is further disposed within a second housing 125 that completely encloses fan 124 and opening 126, except for open input and output ends indicated to the left of fan 124 and to the right of opening 126, respectively, in FIG. 2. As indicated in the Figure, an inward portion of second housing 125 is disposed within upper volume 74, while the remaining portion extends outward of out housing 54 from opening 126. Because fan 124 is disposed within second housing 125, inward of the left opening (in the perspective of FIG. 2) second housing 125 directs all or substantially all of the air flow induced by fan 124 towards outlet 126. Without second housing 125, fan 124 would push a portion of the air flow generated by the moving fan blades through outlet 126, but a remaining portion of the air flow would diverge within upper volume 74, radially from a flow direction from the fan through outlet 126, thereby recirculating back within upper volume 74. In other words, without second housing 125, a portion of air flow induced by fan 124 circulates back within upper volume 74 instead of exiting outlet 126. Thus, in embodiments excluding second housing 125, a fan having a capacity identical to a fan within a second housing 125 must run at a speed higher than the speed of such a housing-enclosed fan in order to force an equivalent mass flow rate of air through volume 74, thereby causing greater fan noise than if the fan were operating at a lower speed. In the illustrated embodiment, the fan's output air flow is entirely received within the second housing. A portion of second housing 125 has a frustoconical taper that decreases in cross-sectional area in the direction of air flow in order to accommodate a fan having a fan blade diameter larger than the diameter or other width of outlet hole 126. As should be understood, the frustoconical taper further minimizes a pressure drop between the fan and the outlet by reducing the cross-sectional area of the flow more gradually than would occur with an immediate 90° change in diameter.

While in the illustrated embodiment, the evaporator coil is disposed upstream (with respect to the air flow generated by fan 125) of fan 124 and outside of the enclosure defined by second housing 125, in another embodiment, the evaporator coil, remaining upstream of the fan in the air flow direction, is also disposed within the second housing enclosure, so that both the evaporator coil and fan are disposed within the second housing. In yet another embodiment, the fan and the evaporator coil are within the second housing enclosure, but their positions in the second housing are reversed, so that the fan is upstream (with respect to the air flow direction) of the evaporator coil. Accordingly, the fan and the evaporator coil may be simultaneously disposed within the second housing, in configurations in which the fan is either downstream or upstream of the evaporator coil.

Second housing 125 protrudes through upper skirt portion 66 so that a cylindrical protruding portion 130 extends from outer housing 54. Portion 130 extends a distance away from upper skirt portion 66 sufficient to attach a duct 135 of the building's HVAC system. The duct's attachment to the hybrid water heater may be advantageous for various reasons. If, for example, a water heater is placed in a small room, the water heater's heat pump may generate enough cool output air to lower room temperature to a point at which the hybrid water heater's efficiency is impaired. Thus, ducting the cool output air away from the room may increase system efficiency, despite the increase in air flow resistance created by the duct. Additionally, the duct may lead the cooled air exiting the water heater to a particular location remote from the water heater room in which excess heat may exist or in which lower temperatures may otherwise be desired, such as, for example, a kitchen or a computer system server room. Protruding end 130 facilitates duct attachment in that it provides a surface that conforms generally to the duct's inner diameter. The outer diameter of protruding portion is sized, for example, so that an eight-inch duct fits over the exterior of protruding portion 130. In some embodiments, the protruding portion's outer diameter is 7¾ inches where eight-inch ducts are used, thereby providing a quarter inch of clearance. Although ducts of circular cross section are referenced herein, it should be understood that this is for purposes of example only. Protrusion portion 130 may be polygonally shaped, for example square or rectangular, in cross section to conform to a correspondingly shaped inner surface of a duct 135. Duct 135 may extend straight away from the unit (in the direction of the arrows shown in FIG. 2) or may bend, e.g. via a direction-adjustable nozzle, to direct the air in a desired direction. The duct may be attached to the protruding portion and sealed with duct tape, screws, sheet metal screws, duct sealant, a hose clamp 137, or other known ductwork attachment methods.

In providing an outlet to mate with a duct from inner volume 74 with a protruding surface having an inner diameter that is the same as the outlet diameter, the outlet can be formed so that its diameter or cross-sectional area can approximately equal the inner diameter or cross-sectional area of the duct, where the diameter of outlet 126 differs from the duct inner diameter by approximately the wall thicknesses of second housing 125 or not at all (the gap between the outer diameter of second housing 125 and the duct inner diameter shown in FIG. 2 being provided for purposes of illustration only and not being present in the actual embodiment). Thus, a duct 135 of a size commensurate with the cross-sectional area of housing opening 126 and the outer diameter of second housing 125 attaches to the protruding outlet. Therefore, the air flow volume does not experience a sudden discontinuity in the flow path at the connection between the duct and the water heater/second housing, and thus does not expand (so that the streamlines do not diverge) significantly outward upon passing through the outlet. Because the air flow is not associated with a significant orifice pressure drop, the fan is run at a speed lower than a speed at which the fan would need to operate to achieve the same mass flow rate if the duct were attached about a diameter greater than the outlet diameter and therefore forced to overcome the resultantly greater orifice pressure drop.

Figure 5:
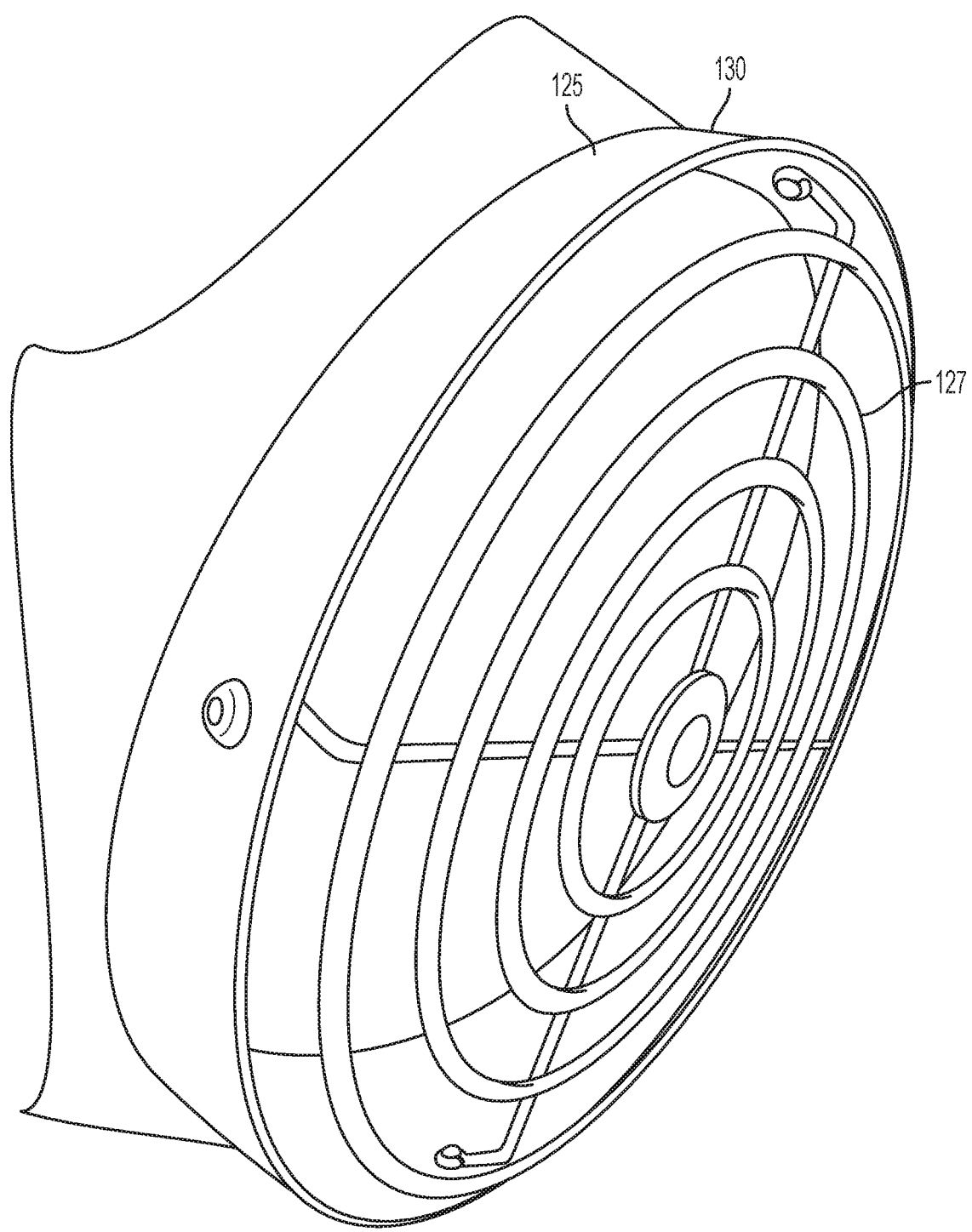
FIG. 5 is a partial schematic view of a secondary housing of the heat pump water heater of FIG. 2.

Referring also to FIGS. 3 and 5, a wire grill 127 that attaches to an opening at or inward of the end of second housing 125 outside the water heater housing prevents undesired objects from entering outlet hole 126, while minimizing air resistance (as compared to, for example, a screen or plurality of small holes in upper skirt portion 66 in place of one outlet hole) and thus minimizing pressure drop across the outlet. Wire grill comprises a wire "X" frame that provides a generally planar surface against which concentric circular wire loops are welded. Distal ends of the wire "X" frame are bent to have loops extending perpendicular to the wire "X" frame's planar surface and inwards towards the interior of volume 74. The loops have generally oval shapes with minor inner dimensions that are sized to receive and hold a 3/16 inch blind rivet. The loops of wire grill 127 extend inside second housing 125 and are located with respect to each other so that opposing loops' outside edges (in the radial direction of the concentric wire circles) are spaced the distance of the inner diameter of protruding end 130. In this way, wire frame 100 rests against an interior surface of protruding end 130. Wire grill 127 attaches to second housing via rivets through protruding portion 130 and through the wire loops in the wire frame so that the heads of the rivets are approximately flush with the outer surface of protruding portion 130. In this way, the rivets, having a low profile, enable a duct to slide over the exterior of protruding portion 130 and the rivets' flush heads so that a duct may easily attach.

As illustrated in FIG. 2, fan 124 draws air into volume 74 via an inlet opening 128 in top portion 68 of water tank outer housing 54. By disposing opening 128 through top portion 68 (as opposed to a side surface of the tank), compressor noise is directed upward, thereby minimizing noise levels directed to individuals near water heater 50. Like outlet opening 126, a wire grill 129, identical to that of wire grill 127, covers inlet opening 128, attached to an outward-facing (away from volume 74) flange attached to top portion 68 about inlet opening 128. Loops of wire grill 129 extend into the outward facing flange, and wire grill 129 is riveted in place in a manner similar to that of wire grill 127 discussed above.

Foam guide 134, embodied as stepped sections of foam but in other embodiments comprising a continuous transition surface, baffles both fan/compressor noise and the air flow from inlet 128 toward evaporator coil 120. Foam guide 134, by directing air flow, reduces the pressure drop from opening 128 to evaporator coil 120 compared to a configuration in which foam guide 134 is not present. In an embodiment, foam guide 134 is comprised of a stack of open cell foam sheets having generally half-cylindrical cutouts of decreasing diameters in the downward direction, away from opening 128. (In FIG. 2, baffle 134 is represented as a cross-section and therefore shown as descending steps from left to right; in FIG. 3, baffle 134 is represented as concentric semicircles.) The stack creates a stepped (or terraced) frustoconical profile that directs air from the inlet to the evaporator coil. In the absence of foam guide 134, the air flow is subject to abrupt changes in the relatively deep and rigid boundaries of volume 74 (e.g., the right angle intersection of upper skirt portion 66 and shelf 72). These abrupt direction changes create eddies (swirling flows that create reverse currents) that impede air flow through volume 74. With the inclusion of foam guide/baffle 134 within volume 74, the flow does not impact abrupt boundary changes and does not create large, numerous eddies. Instead, the small incremental steps of baffle 134 create fewer, smaller eddies that restrict flow to a lesser extent, thus requiring fan 124 to generate a lower static pressure than would be required of the fan to maintain the same air flow rate in the absence of baffle 134. In a further embodiment, stepped foam guide 134 may instead be embodied as a continuous piece and may be embodied as other shapes, including a continuous (not stepped) frustoconical profile or a scoop generally approximating a surface of a section of a paraboloid. In yet a further embodiment, stepped foam guide 134 may be substituted or supplemented with one or more additional baffles of various profiles designed to serve the same flow-directing purpose, e.g. one or more metal turning vanes.

A pair of side baffles 132 direct air towards second housing 125 and fan 124 from evaporator 120. In an embodiment without baffles 132, undirected flow would circulate into the further extents of volume 74, causing eddies that would generate a back pressure, requiring a higher fan speed and higher static pressure than does an embodiment with baffles 132 to generate the same air flow rate. Baffles 132 reduce abrupt air flow changes and minimize pressure drops in air flow through volume 74, thereby minimizing fan speed and optimizing fan efficiency and noise level.

Further to minimize noise, fan 124 is disposed at the open end of second housing 125 within upper volume 74, away from outlet 126, so that the fan is not adjacent the outlet. In a given embodiment, the spacing between fan 124 (and second housing 125's inlet) and outlet 126 balances the reduction in noise arising from that spacing against an efficiency arising from the fan's disposition with respect to evaporator coil 120. Because the evaporator's cross-sectional area is greater than that of the fan (considered perpendicular to the direction of air flow), as fan 124 is moved closer to evaporator 120, a lesser volume of air is drawn through the outer (e.g. radially outer, transverse to the air flow direction) edges of evaporator coil 120. As should be understood, air stream lines converge at the inlet of housing 125, and so disposing the evaporator closer to the second housing inlet, and thus closer to the evaporator coil, causes a higher concentration of streamlines passing through the center of the evaporator than if the evaporator were disposed further from the second housing inlet. Therefore, disposing the fan closer to the evaporator may cause portions of the evaporator to be less utilized, thereby reducing coil 120's efficiency and possibly requiring a higher fan speed to compensate for the lower efficiency. Further, the closer fan 124 is disposed in relation to evaporator 120, the sharper baffles 132 must be angled (e.g., the planes of baffles 132 further approach parallel to the plane of housing 125's opening) in order to direct air into housing 125, thereby causing a larger pressure drop than would more gradual angles. Thus, an optimal spacing may exist between fan 124 and evaporator coil 120 in a given embodiment to thereby minimize the noise contributed to the environment ambient to water heater 50 via outlet 126 due to a spacing between fan 124 and outlet 126, on one hand, and, on the other hand, to minimize fan noise by running the fan at a lower or minimum speed as allowed by the spacing between evaporator coil 120 and the fan. Further, the extent to which the efficiency of coil 120 is increased, and the fan speed decreased, power consumed by the compressor and fan is reduced. Further, a motor 134 that drives fan 124 is mounted inside housing 125 between fan 124's blades and outlet 126 or the outlet of second housing 125 in order to allow a maximum distance between fan 124's blades and outlet 126 or the outlet of second housing 125 (within second housing 125), as the fan blades cause a majority of the fan noise. In certain example embodiments, fan 124 is spaced from evaporator 120 (in the direction of air flow) six inches, or approximately six inches, or more.

As should be understood in view of the present disclosure, the operation of the system described herein may be modeled by available and known heat transfer modeling systems and methods, utilizing the fan/evaporator spacing (and, in these or other embodiments as described below, fan and evaporator size) as variables to obtain initial ranges of spacings (and, in some embodiments, ranges of fan sizes and evaporator sizes) that result in acceptable efficiency ranges. Within those parameters, the system designer may test particular system configurations for efficiency, noise level, and ability to be housed within upper volume 74, selecting the configuration that balances these constraints as desired.

As indicated above, second housing 125 introduces static pressure losses in the air flow between fan 124 and the second housing's air flow outlet. To at least in part offset such losses, evaporator coil 120 is increased in size from an initial size needed to achieve a desired air conditioning capacity in conjunction with fan 124. As should be understood, static pressure losses associated with air flow through the evaporator coil are, for a given air flow rate, inversely proportional to a ratio of the evaporator coil's cross-sectional area (the area of the evaporator coil in a plane perpendicular to the air flow's direction of travel through the evaporator coil) to the evaporator coil's depth (the evaporator coil's length in the air flow's travel direction). That is, static pressure losses decrease when the evaporator coil is wider and shallower, whereas losses increase when the evaporator coil is smaller and deeper. As should also be understood, capacity of an air conditioning unit may be described in terms of an amount of heat that can be removed from a conditioned space within a given period of time, for example in terms of Btus or tons. Given a desired air conditioning capacity, coil 120 and fan 124 may be selected with respect to each other to achieve the desired capacity. Given that selection, then in order to offset the static pressure losses arising from the second housing, the size selection for coil 120 is increased. Since the desired air conditioning capacity remains the same, the increased coil size allows the fan size to be reduced, while maintaining that capacity, resulting in lower static pressure losses associated with the second housing and lower fan noise. Accordingly, the selection of a larger coil to offset pressure losses from air flow generated by the fan results in the ability to utilize a smaller fan and, therefore, a lower air flow rate and lower associated losses. Thus, the particular relationship for a given embodiment may be determined by trials and testing until an acceptable set of components is achieved.

For example, the system designer may initially determine a minimum desired capacity for the heat pump system, for example expressed in terms of BTU/hr, or the amount of heat removed from the flow of air passing through volume 74 by the evaporator and (less losses) contributed to the refrigerant flowing through line 108. The designer also determines a minimum desired air flow rate through volume 74, e.g. in terms of cubic feet per minute (CFM), when fan 124 is in operation. The flow rate may be determined based on the desired length of ducting 135, in that air flow static losses vary directly with duct length. As should be understood, static pressure of an air flow system may be estimated based on the system's geometry utilizing known models and tables. In an embodiment, for example, it is desired that the system be capable for use with up to about 125 feet of duct 135, e.g. where the duct is eight inches in cross sectional diameter. It has been found that, under such conditions, a rate of air flow through volume 74 of between about 135 CFM to about 165 CFM, and in certain embodiments about 150 CFM, provides sufficiently low static losses to maintain a desired overall system efficiency.

Having determined a desired air flow rate, and static losses associated with that rate, under presumed operating conditions (e.g. air temperature), the designer selects a fan configuration, size (e.g. described in terms of outer blade diameter for a circular fan), and operating speed range combination that is at least sufficient to provide the desired air flow rate, given the estimated static pressure. As should be understood, the structural configuration of a fan, e.g. the configuration of fan blades, the dimensional size of the portion of the fan that generates air flow, and the speed at which that part of the fan operates determines the air flow rate the fan produces for a given static pressure. Since the design process above provides a desired air flow rate and an estimated static pressure, the designer may select among those three variables to define an overall fan configuration and speed that produces at least the desired air flow rate at the estimated static pressure. In some embodiments, a maximum desired fan noise level may be defined and utilized as a design criteria in selecting fan configuration and speed. For example, a fan configuration may be chosen that results in a noise level, e.g. measured at a position outside the water heater housing at a location at which a user may be likely to stand, that is at or below the maximum noise level when the fan operates at its maximum rate permitted by the system controller during system operation, or at a level to produce an air flow rate at or above the minimum desired air flow rate. As should be understood, fan noise varies directly with each of fan size and speed. Because, as described above, the desired air flow rate is relatively low, it is possible to define a fan configuration that balances size and speed to result in a correspondingly relatively low noise level. Thus, while in certain embodiments the fan configuration can result in an air flow rate that is at or approximately at the minimum desired air flow rate as described above, in certain embodiments the fan configuration is chosen to result in an air flow rate that is greater than that originally desired air flow rate. In certain such embodiments, fan configuration is chosen so that the air flow rate is within about 10% or within about 15% of the originally desired air flow rate, balancing fan size and fan speed to achieve a minimum noise level (based on the above-described constraints) or a noise level below a desired threshold.

Having defined a fan configuration and desired air flow rate, at an estimated static pressure, the designer defines an evaporator configuration to meet these criteria. As should be understood, evaporator capacity, in terms of air flow rate, may be a function of the evaporator's configuration and dimensions. For instance, in certain embodiments the evaporator may comprise a plurality of coils, e.g. two, each coil being a refrigerant tube that extends (considered with respect to its center axis) generally horizontally across the evaporator's width, doubling back repeatedly as the coil extends vertically across the evaporator's height so that the coil substantially covers the evaporator's cross section in a generally planar volume that extends perpendicularly to the direction of air flow through the evaporator. The second coil is disposed adjacent and immediately behind the first coil. An input manifold connects the incoming refrigerant line to the inputs of the two coils, thereby dividing the refrigerant flow between them, and an output manifold connects the coil outputs with the outgoing refrigerant line, thereby recombining the two refrigerant flows. A plurality of fins extend vertically across the evaporator's height, interrupted by the tubes, to which the fins connect and about which the fins pass, as the fins extend from the evaporator's bottom to its top. The fins define gaps between them, so that the air flow passes between the fins (and between the coil sections) as the air flows front-to-back through the evaporator. The coils and the fins provide the evaporator surface area to which the flowing air transfers heat, with the fins contributing heat to the coils through their interconnection, whereby the coil walls, in turn, contribute heat to the refrigerant flowing through the coils. In general, the heat capacity varies directly with surface area of the coils and fins, and it is thus possible to increase or decrease that capacity through appropriate control of evaporator surface area. An increase in evaporator surface area without increasing the evaporator's overall cross sectional area, e.g. by increasing the density of the fins (expressed, e.g., as fins per inch across the evaporator) and/or the coils, may increase static pressure to the point that the fan configuration (discussed above) no longer meets the air flow requirement. Even where fin density is maintained, increasing evaporator surface area by increasing fin and/or coil depth (in the direction of air flow) may have the same effect because such a design change increases air flow resistance through the evaporator. In certain embodiments, therefore, the evaporator's cross sectional area is increased, while maintaining fin density across the evaporator surface and maintaining fin depth in the air flow direction. While the increase in surface area does increase air flow resistance (conversely, decrease air flow capacity), the increase is less than that which would occur upon increases in fin density and/or fin depth sufficient to provide an equivalent capacity increase. Accordingly, the evaporator design controls fin depth and density at levels sufficient to maintain system static pressure at a level such that the selected fan configuration and speed maintains the desired air flow rate, and controls evaporator cross sectional area so that the air conditioning system achieves at least the desired heat capacity.

Since, as described above, fan configuration is biased to a small fan size due to low fan noise as a design criteria, as permitted by the relatively low air flow rate to facilitate a relatively long duct, the utilization of evaporator surface area to achieve a desired heat capacity tends to result in evaporator surface areas that are larger than would be expected in combination with the fan size. If, however, volume 74 can accommodate the so-sized evaporator, the evaporator/fan combination allows air conditioning system to achieve the desired heat capacity while maintaining the fan within desired noise levels. If volume 74 cannot accommodate the evaporator resulting from the initial design pass, fan size may be incrementally increased, or evaporator depth and/or fin density increased, and the evaporator design repeated to result in a correspondingly smaller evaporator area. This process is repeated until an evaporator design is achieved that can be accommodated in volume 74.

When fan 124 is activated, the fan draws a stream of ambient air from an area exterior to the water heater through inlet opening 128 into volume 74. The air flows over compressor 122, thereby acquiring additional heat therefrom, to and about the coil of evaporator 120, through fan 124, and out outlet 126, as indicated at 132.

The heat pump system's compressor 122 (i.e. a pump) pumps a gaseous refrigerant, for example a hydro-fluorocarbon refrigerant such as R-410A, R-407C, R-134A or other suitable refrigerant, forward from the compressor, increasing the refrigerant's pressure and temperature and causing the now-hotter refrigerant gas to flow through condenser coil 116. As noted above, the refrigerant conduit of coil 116 directly abuts the outer surface of tank body 52, so that the water within tank volume 60 and refrigerant flowing through the refrigerant conduit are separated only by the walls of tank 52 and conduit 108. The walls of tank 52 and conduit 108, being made of steel and aluminum, respectively, are good conductors of heat. Thus, the refrigerant flowing through coil 116 contributes heat to water within tank 52, via the tank and refrigerant conduit walls.

As the refrigerant moves through condenser coil 116, it condenses to liquid phase. Still under pressure provided by compressor 122, the now-liquid refrigerant flows from the output of condenser 116 to expansion valve 118. The expansion valve drops the pressure of the liquid refrigerant as it enters evaporator coil 120. Within the evaporator, the refrigerant transitions to gaseous phase, drawing heat energy from air flowing over the evaporator coil, the heat being contributed by the environment ambient to water heater 50 and by compressor 122. The removal of heat from the air flowing through the evaporator cools the air output from the system, as indicated at 132, and in some embodiments the cool air may be captured and directed to an air-conditioning system used within the building in which water heater 50 is located by a duct attached to second housing 125, as described above. The now-warmer gaseous refrigerant discharged from evaporator 120 then returns to compressor 122 via a suction line of refrigerant conduit line 108 that extends between evaporator 120 and compressor 122, and the cycle repeats.

Figure 6:
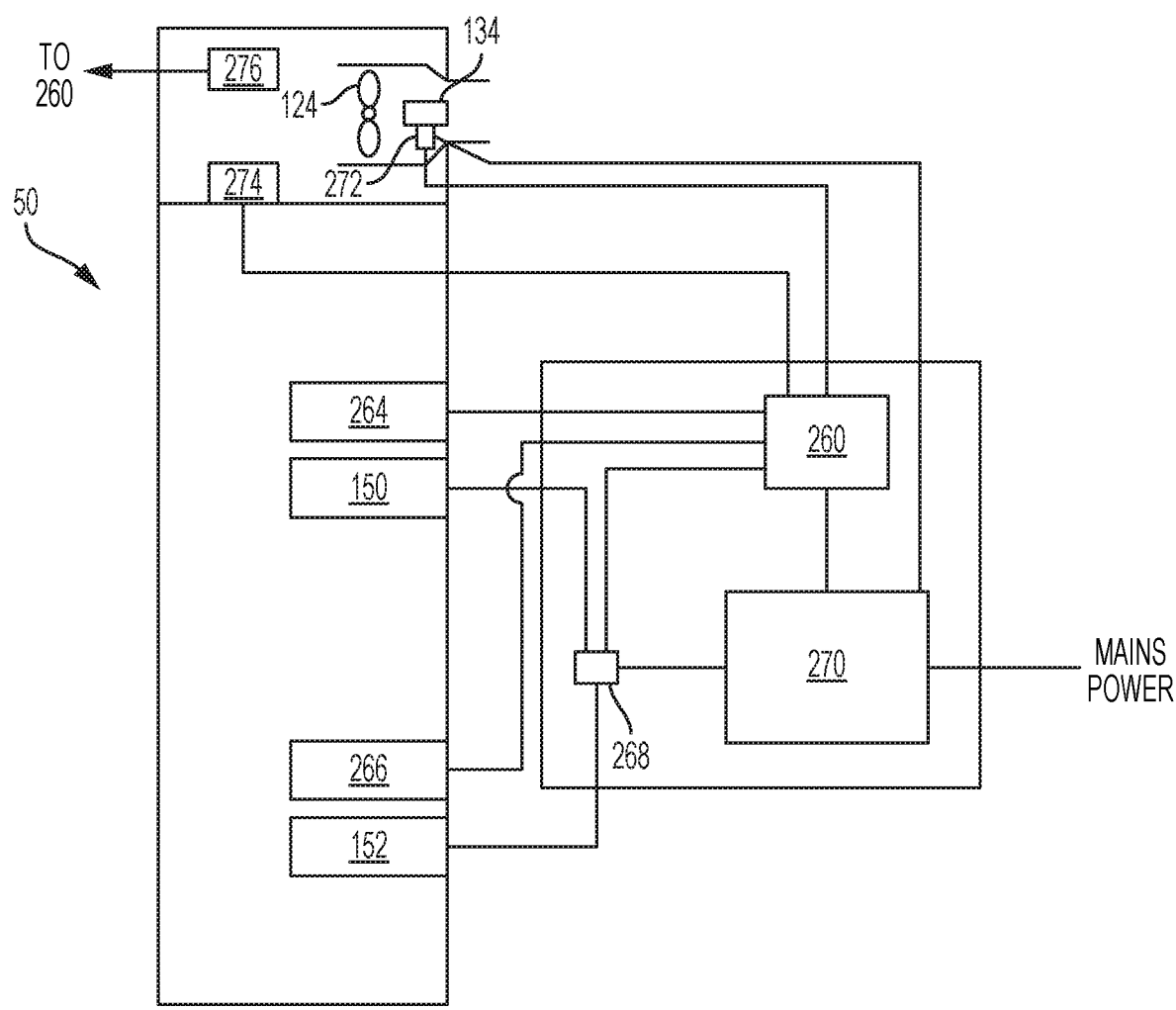
FIG. 6 is a schematic view of a control system for controlling the water heaters of FIGS. 2-5.

An electronic control system (shown in part in FIG. 6 and present in the systems of FIGS. 2 and 3) controls the various functions of the heat pump water heater and operates the various controlled components thereof. The control system comprises a programmable logic controller (PLC), processor, or other computer 260 that operates as a general system controller for heat pump water heater 50. Housed, for example, within a compartment disposed within outer housing 54 (FIG. 2), the controller communicates with and controls (through suitable electrical wired or wireless connections, relays, power sources, and/or other electromechanical connections, as should be understood in this art) the actuation and operation of the controllable components and sensors described herein, including but not limited to the compressor, fan, water pump (if present), water temperature sensor, electric heating elements, and all other electrically controlled valves, relays, and components. As such, the control system communicates with and controls the operative components of water heater 50, including the compressor, to thereby control refrigerant flow. The reference to connections between the control system and each of the components of water heater 50 encompasses such communications and control. Such communication may also encompass communication between the control system and a temperature sensor 276 that measure the temperature of air within volume 74 (FIG. 2). Because air is drawn into volume 74 from an area ambient to water heater 50, the signal from sensor 276 provides information to the control system corresponding to temperature of the environment ambient to water heater 50.

It will be understood from the present disclosure that the functions ascribed to the control system may be embodied by computer-executable instructions of a program that executes on one or more PLCs or other computers that operate(s) as the general system controller for water heater 50. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, as well as personal computers, hand-held computing devices, microprocessor-based or programmable consumer or industrial electronics, and the like. Aspects of these functions may also be practiced in distributed computing environments, for example in so-called "smart" arrangements and systems, where tasks are performed by remote processing devices that are linked through a local or wide area communications network to the components otherwise illustrated in the Figures. In a distributed computing environment, programming modules may be located in both local and remote memory storage devices. Thus, the control system may comprise a computing device that communicates with the system components described herein via hard wire or wireless local or remote networks. A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi-processor architectures can be employed as the processing unit.

Software applications may act as an intermediary between users and/or other computers and the basic computer resources of the electronic control system, as described, in suitable operating environments. Such software applications include one or both of system and application software. System software can include an operating system that acts to control and allocate resources of the control system. Application software takes advantage of the management of resources by system software through the program models and data stored on system memory. The control system may also, but does not necessarily, include one or more interface components that are communicatively coupled through the bus and facilitate an operator's interaction with the control system. By way of example, the interface component can be a port (e.g., serial, parallel, PCMCIA, USC, or FireWire) or an interface card, or the like. The interface component can receive input and provide output (wired or wirelessly). For instance input can be received from devices including but not limited to a pointing device such as a mouse, track ball, stylus, touch pad, key pad, touch screen display, keyboard, microphone, joy stick, gamepad, satellite dish, scanner, camera, electromechanical switches and/or variable resistors or other adjustable components, or other components. Output can also be supplied by the control system to output devices via the interface component. Output devices can include displays (for example cathode ray tubes, liquid crystal display, light emitting diodes, or plasma) whether touch screen or otherwise, speakers, printers, and other components. In particular, by such means, the control system receives inputs from, and directs outputs to, the various components with which the control system communicates, as described herein.

In general, controller 260 operates electric heating elements 150, 152 in response to signals from respective temperature sensors 264 and 266 within water volume 60 (FIG. 2) or attached to the exterior of tank body 52 (FIG. 2) opposite the water in volume 60. In addition to providing power to controller 260, a power supply 270 selectively provides power to electric resistance heating elements 150 and 152 by way of a switching unit 268, which comprises respective electromechanical or solid state relays that connect the power source to the heating elements and that are controlled by signals from controller 260. The control system memory (not shown but in communication with controller 260) stores a lower and an upper set point, as described above. When the controller detects, via the signal from a temperature sensor, that the water in volume 60 proximate one of the heating elements is below the high set point, it does not actuate the heating element's relay within switching unit 268 until the water temperature reaches the low set point. When the water reaches the low set point, the controller actuates the relay to send current to the electric heating elements from power source 270, thereby heating the water via direct thermal conduction. The controller respectively maintains actuation of the electric heating elements until the water temperature surrounding the respective element reaches the high set point, at the occurrence of which the controller deactivates the respective relay and thus the heating element, keeping the element inactive until the water surrounding it again reaches the low set point. It will be understood that the programming of controller 260 may execute various other algorithms for controlling the heating elements. One such algorithm, for instance, executes as above, except that controller 260, additionally, actuates lower heating element 152 only if controller 260 is not applying power to upper heating element 150, or in other words when conditions are such that the controller does not actuate the upper heating element. It will thus be understood that various such algorithms fall within the scope of the present disclosure.

In one or more embodiments, controller 260 is configured (e.g. through the use of program instructions stored in memory and executable by the controller) to control the speed of fan 124 in response to a temperature of the refrigerant. In such embodiments, fan motor 134 may be a multi-speed motor that can be controlled to a desired speed by application of a potential across various predetermined taps provided on the motor. A multi-state switch 272 and associated circuitry controls application of electrical power from power source 270 to a given tap or taps in response to a control signal from controller 260. In other embodiments, multi-state switch 272, its corresponding relays, and other relays to control other devices as discussed herein, are incorporated within controller 260. Moreover, it should be understood from the present disclosure that fan 124 may be controlled to variable speeds through other control methods and equipment and that the presently described embodiment is provided only by way of example. In one or more such embodiments, a temperature sensor 274 is in electrical communication with the controller and is disposed with respect to the refrigerant to measure the refrigerant's temperature, for example, at the outlet of the evaporator coil or at the refrigerant line in the lower part of the water heater. For example, the temperature sensor may be exposed to the refrigerant by mounting the sensor on or adjacent to a refrigerant line to thereby measure heat conducted through the refrigerant line. In such examples, the temperature sensor or the controller may use a correction factor to convert between the measured temperature as recorded by the sensor and an actual temperature of the refrigerant at the evaporator coil, based on prior testing and calibration. In an embodiment, the controller increases the speed of the fan if the refrigerant temperature at the evaporator coil is below a predetermined threshold associated (determined, e.g., through testing) with proper system operation. A refrigerant temperature drop may be caused, for example, by a drop in ambient air temperature or a back pressure that decreases air flow rate across the evaporator. Conversely, controller 260 may drive fan 124 at a lower speed if a lower static pressure, and correspondingly lower flow rate, are required, thereby allowing the fan to operate at a quieter, more efficient setting. As should be understood, low static pressure conditions can arise, for example, at the occurrence of filter maintenance or in the presence of relatively dry air that, in turn, results in the deposition of less condensate at the evaporator that would otherwise increase static pressure drop.

In a further embodiment, where the fan is capable of operating at a plurality of discrete, predetermined speeds, the controller memory may store a table that associates ranges of refrigerant temperatures with respective discrete fan speeds, where each fan speed causes the system to operate at a desired efficiency range when refrigerant temperature is within the corresponding range, as determined by system testing. Depending on the sensed refrigerant temperature, the controller determines the speed of the fan. For example, when the refrigerant temperature changes from a first temperature to a second temperature, e.g. passing a threshold from one of the refrigerant temperature ranges to the next, and the first temperature is lower than the second temperature, the controller increases the speed of the fan from one of the discrete speeds to the next.

In this way, the controller may decrease the noise of the fan. Moreover, fan speed variation enables the water heater to reach a higher operating efficiency. When air temperatures are high, the air being pulled across the evaporator contributes more energy to the refrigerant than when air temperatures are lower. In such circumstances, the fan speed may be lowered, thereby lowering the air flow and the corresponding heat transfer from air to refrigerant while still providing an air flow sufficient to contribute the same or substantially the same heat to the refrigerant as when air temperatures are lower.

In certain embodiments, the controller may execute computer instructions (which may be stored in the memory) that, if the fan is operating at a steady state speed, cause the controller to control the fan to switch to a higher speed if the air temperature signal output from sensor 276 (described below) indicates an air temperature within volume 74 (FIG. 3), and consequently ambient to the heat pump (in that fan 124 draws air into volume 74 from the ambient area), below 45° F. or if a signal from refrigerant temperature sensor 274 indicates a refrigerant temperature that drops below 32° F. and remains below that threshold for at least a predetermined threshold period of time, e.g. fifteen minutes. From the high speed, the controller moves fan speed back to steady state when air temperature is above 45° F. and the refrigerant temperature is above 32° F. Conversely, if the fan speed is operating at the steady state speed, the computer instructions cause the controller to switch the fan to the lower speed if the air temperature rises above 100° F.

Increasing the fan speed increases the static pressure. An excessive static pressure may result in wasted energy. When air temperature is lower, however, less heat is contributed to the refrigerant, and the fan speed may nonetheless need to be increased. As the air temperature directly affects the efficiency, in a further embodiment, a temperature sensor 276 is disposed within the air flow path, e.g. within volume 74 (FIG. 2) upstream of the evaporator. The temperature sensor is in communication with the controller so that the controller varies the fan speed in response to the air temperature. For example, if the air temperature decreases past a certain threshold, the fan speed is incrementally increased; if the air temperature increases past the threshold, the fan speed is incrementally decreased.

In one embodiment, the control system actuates the heat pump, i.e. by actuating compressor 122 (FIG. 2) to move refrigerant through the closed refrigerant path and actuating fan 124, simultaneously with actuation of one or more of the relays in series between the power source and the electric heating elements. That is, when the electric heating elements are being actuated to provide heat to the water in volume 60 (FIG. 2), the heat pump is simultaneously actuated to provide heat to the water from the refrigerant. It should be understood, however, that many variations can be made in the heat pump's operation and thereby in the control system's control of the heat pump. For example, it will be appreciated in view of the present disclosure that the heat pump's efficiency may drop with cooler ambient temperature in that the air flow over the evaporator contributes less heat to the refrigerant. Given a particular heat pump water heater configuration, if it is determined that heat pump efficiency drops to an undesirable level below a certain ambient temperature, the control system may be configured to deactivate the heat pump upon detecting an ambient temperature below that threshold.

Figure 4:
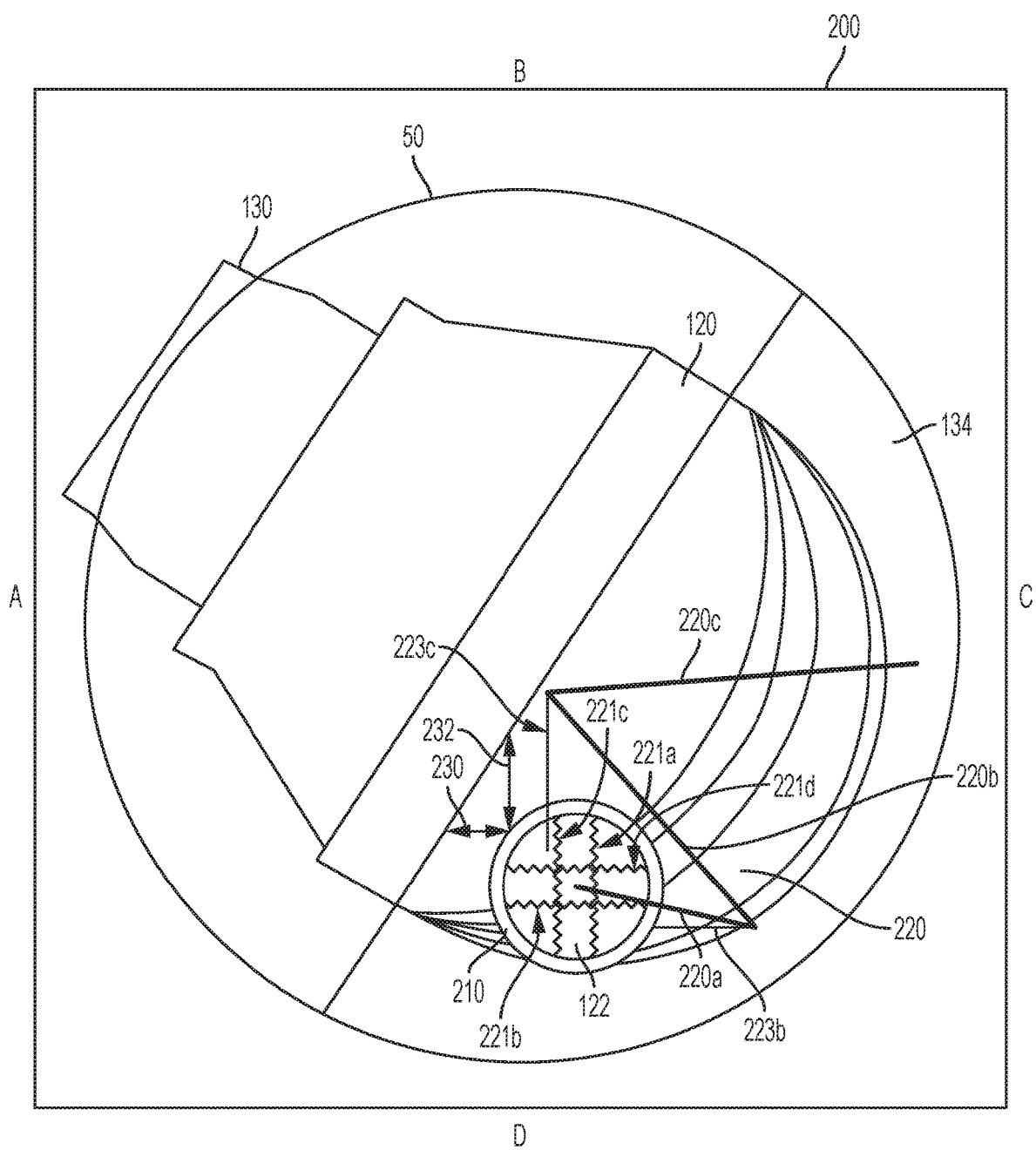
FIG. 4 is a schematic view of a heat pump water heater according to an embodiment of the present invention.

Referring to FIG. 4, in an embodiment, hybrid water heater 50 is configured to be shipped in a rectangular box 200 (e.g. a cuboid box), having a top, a bottom, and four sides, so that hybrid water heater 50 may be shipped while any of the bottom side or any of lateral side A, side B, side C, or side D is the lowermost surface of the box, so that such side of the box rests on the surface that supports the box without causing damage to the water heater. The water heater is designed so that if the water heater is upright, which is the condition when box 200 rests on its bottom side, oil in the compressor remains in its intended location, as should be understood. Alternatively, however, when box 200 receives water heater 50 in a predetermined orientation so that, although the water heater is substantially cylindrical in its external surface shape, when a side of the box is lying flat upon a horizontal support surface, the water heater can be in only one of four predetermined orientations. In an embodiment, water heater 50 is bolted to box 200 and a shipping pallet (not shown but located beneath the bottom of the box when the box is upright, between the bottom of the water heater and bottom of the box). The pallet has an outer perimeter that fits within the inner perimeter of the box but that conforms sufficiently to the box inner perimeter that, once inserted into the box, the pallet cannot rotate within the box about the water heater's (and the box's) axis of elongation. Being attached to the pallet, the water heater is thereby in a fixed rotational orientation with respect to the box about the elongation axis. Water heater 50 is further supported within box 200 via polystyrene foam between the water heater's exterior surface and the box's interior surface. In an embodiment, the polystyrene foam includes cutouts that correspond to and mate with protruding components of water heater 50 (e.g. protruding portion 130) in order to further orient the water heater in the box.

As should be understood, a compressor such as compressor 122 is often constructed so that oil within the compressor (which lubricates the compressor's internal components during the compressor's operation) can be in fluid communication with the refrigerant path through the compressor. During normal operation, when the water heater is in its upright position, the differing weights between the refrigerant and the oil maintain these materials generally separate from each other, though some mixing occurs. During the water heater's shipment, the heat pump refrigerant path does not typically contain refrigerant, but the compressor typically contains oil. When the water heater is in its upright position, a discharge tube 220, which is part of the refrigerant line 108 (FIG. 2), fluidly connects with the compressor at a position in the compressor housing above the oil level, so that there is little risk that oil will flow out of the compressor and into the discharge tube. If the water heater is disposed on its side, however, oil may flow into the discharge tube. If, when the water heater is later returned to its upright position, the oil does not flow back into the compressor, the compressor may not have sufficient oil to operate effectively. While tube 220 is referred to as the discharge tube, in that it is the tube from which the compressor pumps refrigerant out to the refrigerant line's coil/condenser section 116, it should be understood that there is also a refrigerant input line to the compressor. In the presently-discussed embodiments, the compressor is configured so that its oil paths communicate with the refrigerant line discharge tube, but it should be understood that in other embodiments, the oil paths may be in fluid communication with the input tube segment instead or as well. Thus, it should be understood that discussion of the present arrangements with regard to the discharge tube segment is for purposes of example only and that the tubing arrangements herein may also be applied with regard to the input tube segment.

The discharge tube includes a first linear segment 220a extending from a top of compressor 122 at which segment 220a fluidly couples to the compressor. When the water heater is in its upright position, the entry point of segment 220a into the oil-containing volume of the compressor is above the level of the oil in that volume, so that, under normal circumstances, no oil flows through the discharge tube. Segment 220a extends towards sides C and D, and away from sides A and B; a second linear segment 220b extends from a distal side of segment 220a generally towards side B and slightly towards side A; and a third linear segment that extends from the end of segment 220 toward side C. Both first segment 220a and second segment 220b have a continuous downward slope (with respect to the horizontal when the water heater is in its upright operating orientation) towards compressor 122 so that any oil that has leaked out during shipment is gravity biased back into compressor 122 when the water heater is returned to its upright orientation. That is, the intersection of segments 220a and 220b is above the point at which segment 220a communicates with the top of the compressor, and the intersection of segments 220b and 220c is above the intersection between segments 220b and 220c. Segment 220c may extend downward from the intersection between segments 220b and 220c. Both segments 220a and 220b are linear, and therefore define no internal flow traps. Thus, provided that oil, in the event such oil flows into discharge tube 220 for some reason, does not flow past the intersection between segments 220b and 220c, discharge tube 220 drains such oil back into the compressor when the water heater, and therefore the compressor, are once again in an upright position.

When resting on side A, the box is in a first orientation. In its first orientation, an oil level 221a within the compressor is above the entry point of tube segment 220a within the oil volume of the compressor interior, but segment 220a extends vertically upward from compressor 122, thereby preventing oil from draining out of the compressor and further down the discharge tube (away from the compressor). Put another way, the point of intersection between linear segment 220a and 220b is, when the box rests on side A, higher than oil level 221a, so that oil does not flow from segment 220a to 220b. Further, any oil that may have previously drained into segment 220a is biased back into the compressor when the heater is returned to its upright orientation via segment 220a's downward slope. Similarly, when the box rests on side B, the box is in a second orientation, and an oil level 221b within the compressor is above the entry point of tube segment 220a within the compressor interior's oil volume, as indicated by the level line 223b, but segment 220a extends upward to prevent oil from running out of the compressor via the tube. The point of intersection between linear segment 220a and 220b is, when the box rests on side B, higher than oil level 221b, so that oil does not flow from segment 220a to 220b. When the box rests in a third orientation on the box's side C, an oil level 221c within the compressor is above the entry point of tube segment 220a within the compressor interior's oil volume. While tube segment 220a extends downward, below oil level 221c, segment 220b extends from the intersection with segment 221a beyond the level of oil level 221c, as indicated by level line 223c. Thus, when the box is in position on its side C, oil can drain down from the compressor and towards the distal end of segment 220a, but because segment 220b extends above oil level 221c, oil remains trapped at the intersection of the two segments and does not flow past segment 220b and into subsequent segment 220c. The point of intersection between linear segment 220b and 220c is, when the box rests on side C, higher than oil level 221c, so that oil does not flow from segment 220b to 220c. When water heater 50 is returned to its upright orientation, gravity biases the oil in segment 220b towards segment 220a, and from segment 220a to compressor 122. Similarly, in a fourth orientation, when box 200 rests on side D, an oil level 221d within the compressor is above the entry point of tube segment 220a within the compressor interior's oil volume. While tube segment 220a extends downward, below oil level 221d, segment 220b extends from the intersection with segment 221a beyond the level of oil level 221d. Thus, when the box is in position on its side D, oil may drain into segment 220a, but because segment 220b extends upward from segment 220a above the oil level 221d, that oil remains trapped between the segments until the water heater is oriented upright, and the oil returns to the compressor. Accordingly, when the water heater rests on any of sides A, B, C, or D, the entry point of the discharge tube to the oil volume within the compressor is below the oil level within the compressor. However, at least one point in the discharge tube between that entry point and the discharge tube's drain point is higher than the oil level at each respective resting position A, B, C, and D, and that point is higher than the entry point when the water heater is in its upright position, without intervening traps in the discharge tube. Thus, oil may flow out of the compressor when the water heater is at one of the side resting positions but will not flow beyond a predetermined point in the discharge that is higher than the discharge tube entry point when the water heater and compressor are upright, and when the water heater is thereafter disposed in the upright position, any oil that flowed into the discharge tube when the water heater was on its side flows back into the compressor.

Further, when shipped on sides C or D, the weight of compressor 122 biases compressor 122 away from the heat exchanger. However, when shipped on sides A or B, compressor 122 depends toward heat exchanger 120. Further, when resting on sides A or B, as a result of inertia, any bumps or jolts to the downward-facing side of box 200 (e.g. a jolt from a truck driving over an obstacle) results in compressor 122 moving towards evaporator coil 120. However, because the plane of the heat exchanger is at an acute angle with respect to horizontal, travel of the compressor due to weight or jolts does not cause the compressor to travel directly towards coil 120. Rather, the direction of travel is indirect, allowing for a greater range of movement before the compressor impacts the evaporator coil. For example, when on side A, the compressor must travel approximately a distance 230 in order to impact the evaporator coil, and when shipped on side B, the compressor must travel approximately a distance 232 in order to impact the evaporator coil. Therefore, in this configuration, a greater jolt is required to cause the compressor to travel the distance to the coil in the vertical direction (wherein vertical is upward with respect to the side on which the box is shipped).

In all orientations, the compressor extends into a cutout in foam guide 134. Compressor 122 is wrapped in a sheet of closed cell foam 210, which attaches to compressor 122 via adhesive, such as double-sided tape. An outer surface of closed cell foam 210 attaches via adhesive, such as double-sided tape, to foam guide 134. In this way, in addition to isolation mounts upon which a bottom portion of compressor 122 attaches, the compressor is further supported on its sides via the foam, either resting on and compressing the foam, as is the case when the water heater is in the second orientation, or supported by tension on the foam, when the water heater is in the first, third, or fourth orientation. The support provided by foam 134 and foam 210 restricts movement both to limit stresses to refrigerant conduit and minimize risk of compressor impacting coil 120.

While the above disclosure is directed to operation of a hybrid water tank with an electric heating element, further embodiments may be directed to a hybrid water tank with gas heating. An embodiment of a hybrid/gas water heater that may be adapted to incorporate the elements of the present disclosure is illustrated in U.S. patent application Ser. No. 15/084,402 to Jozef Boros, filed Mar. 29, 2016, ("the Boros application") the entire disclosure of which is incorporated herein by reference. The Boros application further discloses a method by which a heat pump water heater may operate in terms of an ideal pressure-enthalpy graph. Moreover, the Boros application illustrates with respect to a hybrid/gas water heater how a hybrid water heater may be operated under various circumstances to optimize parameters such as efficiency. One skilled in the art will understand how to substitute an electric heater for a gas heater and apply the same principles to operation of the water heater as disclosed herein.

It should be understood that various other embodiments may be practiced within the scope of the present invention. For instance, each of the embodiments described above defines the condenser as a coil wrapped around the exterior of the water tank. In still further embodiments, however, the refrigerant conduit does not wrap around the tank but is, instead, part of a heat exchanger that is spatially removed from the tank surface. A second conduit line extends from the tank interior volume to this heat exchanger, and from the heat exchanger back to the tank. That is, the conduit forms a closed fluid path for water from the tank to flow through the heat exchanger, and a pump may be provided to move the water through that path. The water line and the refrigerant line are in sufficient proximity within the heat exchanger so that the hot refrigerant conveys heat to water circulating through the closed water flow path. In further embodiments, the refrigerant path extends into the tank interior, and for example the refrigerant tubing within the tank volume is of a double-walled construction. In these manners, the refrigerant path is in thermal communication with the water tank, including the water tank volume, so that heat transfers from the refrigerant to the water tank volume when refrigerant flows through the refrigerant path.

Modifications and variations to the particular embodiments of the present invention may be practiced by those of ordinary skill in the art, without departing from the spirit and scope of the present invention, which is more particularly set forth in the appended claims. In addition, it should be understood that aspects of the various embodiments maybe interchanged as in whole or in part. Furthermore, those of ordinary skill in the art will appreciate that the foregoing description is by way of example only and is not intended to limit the invention so further described in the appended claims.

What is claimed is:

1. A heat pump water heater, comprising:
   a first housing comprising a top surface having an inlet to receive an air flow;
   a tank for holding water within the first housing and having a tank wall that defines a volume;
   a heat source disposed with respect to the volume to convey heat to water in the tank;
   a refrigerant conduit that defines at least part of a closed refrigerant path; and
   a pump disposed proximate the tank and in fluid communication with the refrigerant conduit so that the pump is part of the refrigerant path and, when operative, pumps refrigerant through the closed refrigerant path,
   wherein a first portion of the refrigerant conduit is in thermal communication with the volume so that refrigerant flowing through the refrigerant path transfers heat to water in the volume;
   a fan disposed adjacent the tank and with respect to a second portion of the refrigerant conduit so that operation of the fan moves the air flow across the second portion of the conduit; and
   one or more baffles configured to direct the air flow from the inlet toward an outlet.

2. The heat pump water heater of claim 1, wherein the heat source comprises at least one electric heating element.

3. The heat pump water heater of claim 1, wherein the second portion of the refrigerant conduit is disposed in the air flow upstream of the fan.

4. The heat pump water heater of claim 1, further comprising a second housing within which the fan is disposed, wherein the second housing comprises a protruding portion that extends through the first housing and beyond the first housing into an area exterior to the first housing.

5. The heat pump water heater of claim 4, further comprising a duct attached to the protruding portion of the second housing.

6. The heat pump water heater of claim 4, wherein the second portion of the refrigerant conduit is disposed within the first housing and outside of the second housing.

7. The heat pump water heater of claim 4, wherein the fan has a motor and at least one fan blade, and wherein the fan is disposed in the second housing so that the motor is between the at least one fan blade and an outlet in the second housing.

8. The heat pump water heater of claim 7, wherein the fan is disposed in the second housing so that the motor is between the at least one fan blade and the first housing through which the second housing extends.

\* \* \* \* \*